(12) United States Patent
Stewart et al.

(10) Patent No.: US 10,474,236 B1
(45) Date of Patent: Nov. 12, 2019

(54) HAPTIC DEVICE FOR VARIABLE BENDING RESISTANCE

(71) Applicant: Facebook Technologies, LLC, Menlo Park, CA (US)

(72) Inventors: Charles Stewart, Bothell, WA (US); Raymond King, Redmond, WA (US); Nicholas Roy Corson, Mukilteo, WA (US); Sean Jason Keller, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 189 days.

(21) Appl. No.: 15/703,691

(22) Filed: Sep. 13, 2017

(51) Int. Cl.
*G06F 3/01* (2006.01)

(52) U.S. Cl.
CPC .............. *G06F 3/014* (2013.01); *G06F 3/016* (2013.01); *G06F 3/017* (2013.01)

(58) Field of Classification Search
CPC ........... G06F 3/014; G06F 3/016; G06F 3/017
USPC ..................................................... 340/407.1
See application file for complete search history.

(56) References Cited

U.S. PATENT DOCUMENTS

| | | | | |
|---|---|---|---|---|
| 9,996,153 | B1* | 6/2018 | Trotta | G06F 3/014 |
| 10,281,982 | B2* | 5/2019 | Keller | G06F 3/016 |
| 10,317,999 | B2* | 6/2019 | Ahne | G06F 3/014 |
| 10,324,530 | B2* | 6/2019 | Keller | G06F 3/016 |
| 2017/0160807 | A1* | 6/2017 | Keller | G06F 3/016 |
| 2017/0168630 | A1* | 6/2017 | Khoshkava | G06F 1/163 |
| 2019/0050052 | A1* | 2/2019 | Hogbin | G06F 3/014 |

* cited by examiner

*Primary Examiner* — Jack K Wang
(74) *Attorney, Agent, or Firm* — Fenwick & West LLP

(57) ABSTRACT

A haptic glove comprises a glove body including a glove digit corresponding to a phalange of a user hand with the glove digit having a bend location that is located along the glove digit. A haptic apparatus is coupled to the glove body at the bend location with the haptic apparatus comprising a plurality of sheets that are flexible and inextensible and a pressure actuator coupled to one or more of the plurality of sheets. The plurality of sheets are stacked and configured to translate relative to each other along the centerline with bending of the glove digit. The pressure actuator is configured to adjust an applied pressure to the plurality of sheets to adjust friction between the sheets. The adjustment of friction is proportional to a bending resistance of the glove digit.

20 Claims, 4 Drawing Sheets

no description available …

HAPTIC DEVICE FOR VARIABLE BENDING RESISTANCE

BACKGROUND

The present disclosure generally relates to a system for providing haptic feedback to a user, and specifically to haptic devices that provide variable bending resistance.

Virtual reality (VR), Augmented reality (AR), Mixed reality (MR), and any combination thereof are simulated environments created by computer technology and presented to a user, such as through a Head-Mounted Display (HMD) system. Typically, a HMD system includes a HMD headset that provides visual and audio information to the user. Conventional HMD systems create virtual hands in the simulated environment and use a hand tracking system to track motion and positions of the user's hands. However, many conventional hand tracking systems are based on optical systems, and such systems may not capture accurate poses of a user's hand. For example, the hand may be positioned such that finger position is obscured by another part of the hand.

SUMMARY

To provide a more immersive experience in an artificial reality system, a haptic glove may apply a resistive force to a user's hand to simulate a user's interaction with a virtual object. For example, the system may detect that a user has reached out to grab a virtual object. This may be detected by sensors integrated into a haptic glove, sensors external to a haptic glove, or some combination thereof. As the user closes her hand to grasp the virtual object, the glove may generate an opposing force that resists the closing of the hand. In this way, the haptic glove simulates the experience of grasping the virtual object. The haptic glove may also produce force feedback corresponding to a real-world machine controlled by the user.

Embodiments relate to a system and a method for providing haptic feedback to a user by controlling a bending resistance of a haptic assembly in touch (directly or indirectly) with a user. The amount of bending resistance relayed to a user can be perceived as a measure of rigidity. For example, a hard material when touched by a user has little give (i.e., minimal bending ability). In contrast, a soft material may give substantially when touched by the user using the same amount of pressure, and accordingly, a user's finger will be able to bend with greater ease in touching a soft material compared to a hard material. In order to emulate a user touching a material of a particular rigidity, the haptic assembly can be actuated such that the bending resistance at a particular location can vary corresponding to the material rigidity. The haptic assembly can produce varying degrees of rigidity to such that a user touching a virtual object in a virtual space with a particular rigidity can be emulated. Emulating herein refers to providing a tactile perception to a user that the user is in physical contact with a virtual object of a particular rigidity.

In one embodiment, the system includes a haptic glove for providing haptic feedback. The haptic glove includes haptic apparatuses coupled to one or more digits of the glove, a haptic controller, and one or more signaling pathways that couple the haptic controller to the haptic apparatuses. The haptic apparatuses restrain bending ability in each location a haptic apparatus is coupled to the glove body. The haptic controller controls the actuation of the one or more haptic apparatuses through one or more signaling pathways coupled between the one or more haptic apparatuses and the haptic controller.

In one aspect, the haptic glove is implemented in a HMD system for providing VR experience, AR experience, MR experience, or any combination thereof to a user. The HMD system includes a head mounted display for presenting an image of a virtual environment to the user according to positional information of the head mounted system. In addition, the HMD system includes the haptic glove for providing haptic feedback to a user. The HMD system updates the image of the 3-D virtual environment according to a positional information of the head mounted display and/or haptic glove. The HMD system also provides haptic feedback to the user via the haptic glove. The haptic glove with the one or more amenable haptic apparatuses disclosed herein can provide haptic feedback simulating different levels of rigidity to emulate a user contacting virtual objects of different materials. Hence, the user can perceive a feeling of touching an imaginary object with certain rigidity, and enjoy a better immersive VR, AR, or MR experience.

DETAILED DESCRIPTION OF THE DRAWINGS

Figure 1:
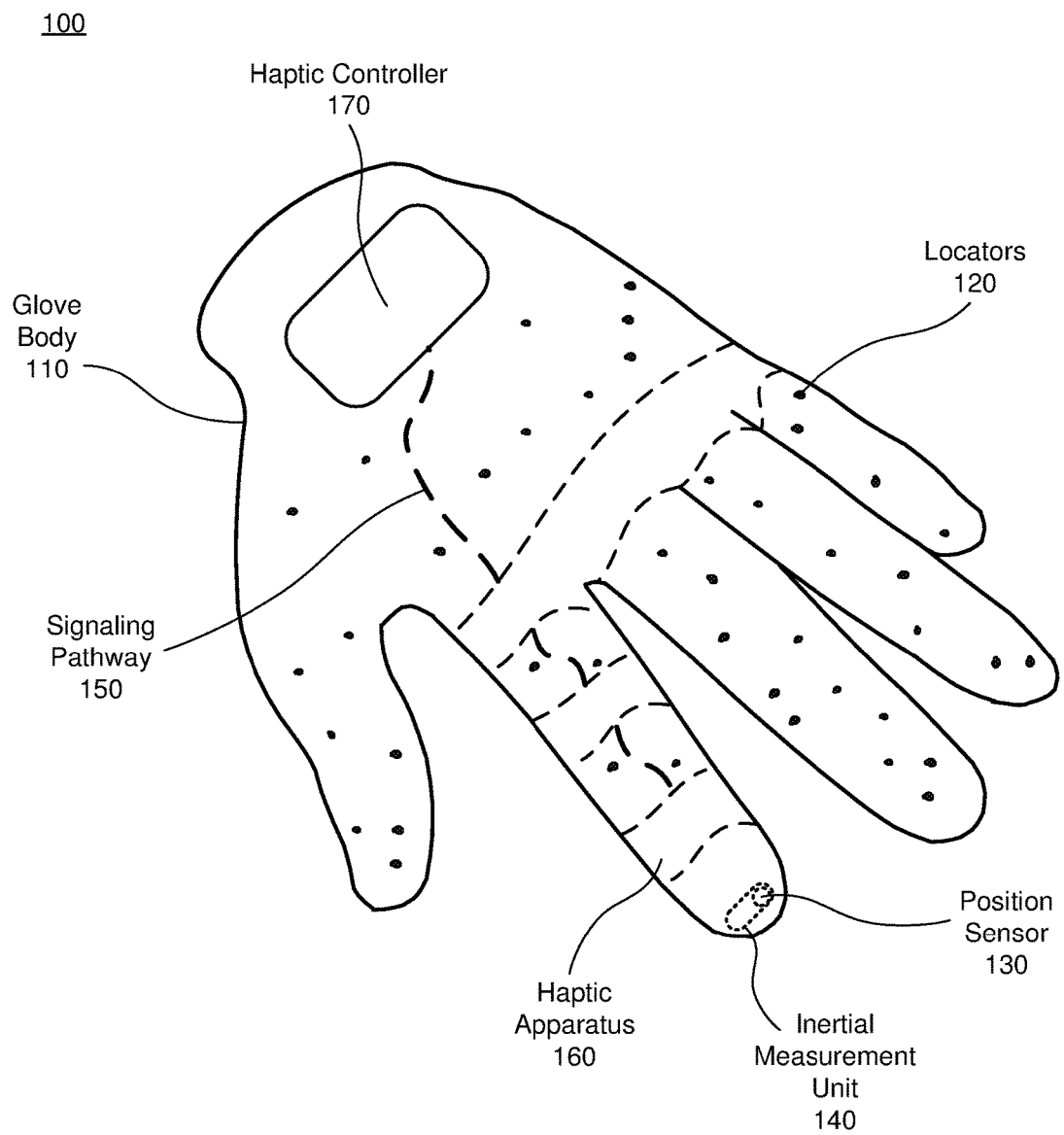
FIG. 1 is a perspective view of a haptic glove, in accordance with an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers Example Haptic Feedback Device FIG. 1 is a perspective view of a haptic glove 100, in accordance with an embodiment. The haptic glove 100 includes a glove body 110, locators 120, a position sensor 130, an inertial measurement unit (IMU) 140, a signaling pathway 150, three haptic apparatuses 160, and a haptic controller 170. In other embodiments, the haptic glove 100 comprises additional or fewer elements than those described herein. Similarly, the functions can be distributed among the elements and/or different entities in a different manner than is described here. For example, in the some embodiments, the haptic controller 170 may be located on a console.

The glove body 110 is an apparatus covering a hand. The glove body 110 is a wearable garment that is coupled to the locators 120, the position sensor 130, the IMU 140, the signaling pathway 150, the haptic apparatuses 160, and the haptic controller 170. In one embodiment, the position sensor 130 is coupled to a corresponding tip of the glove body 110 (e.g., a portion corresponding to a fingertip); three haptic apparatuses 160 are coupled to three corresponding glove digit portions (e.g., a portion corresponding to a distal phalanx, a portion corresponding to an intermediate phalanx, and a portion corresponding to a proximal phalanx) of the glove body 110; and the haptic controller 170 is coupled to a portion of the glove body 110 corresponding to a back of a hand (e.g., dorsal side). The signaling pathway 150 is coupled between the haptic controller 170 and the haptic apparatuses 160. In one embodiment, one or more of these components are placed beneath an outer surface of the glove body 110, thus are not visible from the outside. Additionally or alternatively, some of these components are placed on an outer surface of the glove body 110, and are visually detectable.

The glove body 110 illustrated in FIG. 1 is merely an example, and in different embodiments, the glove body 110 includes fewer, more or different components than shown in FIG. 1. For example, in other embodiments, the number of haptic apparatuses 160 can vary (e.g., one or more on each finger); there can be multiple signaling pathways 150 coupled to the haptic controller 170 and the plurality of haptic apparatuses 160. In addition, in other embodiments, there may be multiple position sensors 130 provided. Also, in one or more embodiments, one or more haptic apparatuses 160 and the haptic controller 170 can be positioned in different portions of the glove body 110. For another example, the haptic apparatus 160 is coupled to wrap around a portion of the entire glove digit of the glove body 110. For another example, the haptic controller 170 is coupled to a different portion of the glove body 110 corresponding to, for example a wrist or a palm.

The locators 120 are objects located in specific positions on the glove body 110 relative to one another. A locator 120 may be a light emitting diode (LED), a corner cube reflector, a reflective marker, a type of light source that contrasts with an environment in which the haptic glove 100 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The position sensor 130 generates one or more measurement signals in response to motion of the haptic glove 100. The position sensor 130 may be located external to the IMU 140, internal to the IMU 140, or some combination thereof.

The IMU 140 is an electronic device that generates IMU data. Based on the one or more measurement signals from one or more position sensors 130, the IMU 140 generates IMU data indicating an estimated position of the haptic glove 100 relative to an initial position of the haptic glove 100.

The signaling pathway 150 passes a haptic actuation signal from the haptic controller 170 to the haptic apparatus 160. The signaling pathway 150 is coupled to the haptic controller 170 and all three haptic apparatuses 160, in accordance to this embodiment. A signaling pathway 150 may be, for example conductive materials for transferring electrical signals, tubes for transferring pneumatic pressure, some other connective link to a haptic apparatus 160, or some combination thereof. In other embodiments, each signaling pathway 150 can be coupled to one or more haptic apparatuses 160. In another embodiment, there can be multiple signaling pathways 150.

The haptic apparatus 160 provides haptic feedback emulating a user touching a virtual object with a corresponding rigidity. In one embodiment, the haptic apparatus 160 is actuated according to a haptic actuation signal received through the signaling pathway 150 from the haptic controller 170. A haptic actuation signal is a pneumatic and/or electrical signal that causes the haptic apparatus 160 to achieve a spectrum of resistance to bending at a bend location coupled to the haptic apparatus 160. In one embodiment, the haptic apparatus 160 is coupled to a glove digit of the glove body 110 (e.g., a distal phalanx), allowing the spectrum of resistance to bending of the glove digit. In another embodiment, the haptic apparatus 160 covers the entire glove body 110 or is placed on other parts (e.g., area corresponding to different phalanx) of the glove body 110. Example materials that the haptic apparatus 160 is constructed from include silicone, textiles, thermoset/thermoplastic polymers, thin steel, or some combination thereof.

The haptic controller 170 modulates the haptic apparatus 160 according to a rigidity of a virtual object. The haptic controller 170 may be an electric board or a fluid reserve, or some other device that controls one or more haptic apparatuses 160 via corresponding signaling pathways 150. The haptic controller 170 transmits a haptic actuation signal through the signaling pathway 150 corresponding to the haptic apparatus 160 to be actuated. The haptic actuation signal instructs the haptic apparatus 160 to restrict to a degree the bending ability at a bend location coupled to the haptic apparatus 160, thus emulating a user contacting a virtual object. Various structures and operations of the haptic apparatus 160 are described in detail with respect to FIGS. 2A & 2B.

In some embodiments, the haptic controller 170 receives a haptic feedback signal and actuates the haptic apparatus 160 accordingly. The haptic controller 170 converts the haptic feedback signal into a haptic actuation signal that can include specification of the haptic apparatus 160 to be actuated and to what degree the haptic apparatus 160 should restrict bending.

In one embodiment, the haptic glove 100 modulates the haptic apparatus 160 for providing a haptic feedback by applying fluidic pressure to the haptic apparatus 160. In one example, the haptic controller 170 is a pump or a valve array that adjusts pressure of fluid (compressible or incompressible), and the signaling pathway 150 is a tube that transfers fluid (compressible or incompressible) from the haptic controller 170 to the haptic apparatus 160. The haptic apparatus 160 may include an expandable bladder that can change its shape according to the fluid (compressible or incompressible) applied through the signaling pathway 150 (e.g., tube) for providing the haptic feedback to the user.

In another embodiment, the haptic glove 100 modulates the haptic apparatus 160 for providing the haptic feedback by applying an electrical signal to the haptic apparatus 160. In one example, the haptic controller 170 is a voltage or a current supplier that generates the electric signal (e.g., voltage or current), and the signaling pathway 150 is a conductive wire that transfers the electric signal to the haptic apparatus 160. The haptic apparatus 160 may include conductive plates and one or more layers including piezoelectric materials between the conductive plates. According to the electric signal, electric fields are generated between the conductive plates adjusting a bending resistance at a bend location coupled to the haptic apparatus 160. The bending resistance provides the haptic feedback to the user.

Figure 2A:
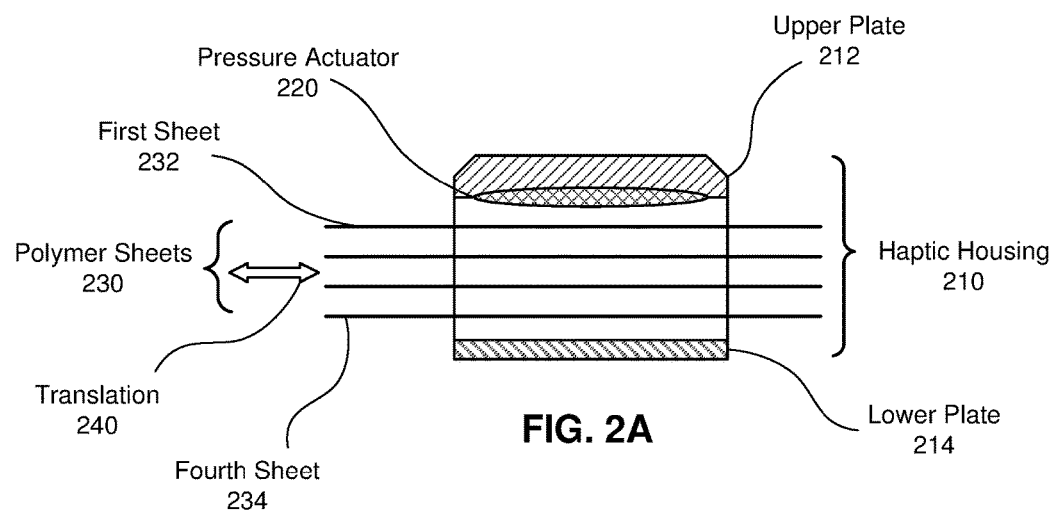
FIG. 2A is a cross sectional view of a haptic apparatus with a pressure actuator allowing bending, in accordance with an embodiment.

FIG. 2A is a cross sectional view of the haptic apparatus 160 allowing bending, in accordance to an embodiment. The haptic apparatus 160 comprises a haptic housing 210 including an upper plate 212 and a lower plate 214, a pressure actuator 220, and polymer sheets 230. The haptic apparatus 160 allows for a translation 240 of the polymer sheets 230. In other embodiments, the haptic apparatus 160 comprises additional or fewer elements than those described herein.

The haptic housing 210 is a container which houses the pressure actuator 220 and a portion of the polymer sheets 230. In this example embodiment, the haptic housing 210 contains an upper plate 212 that is coupled to the pressure actuator 220 and the lower plate that is coupled to the polymer sheets 230. The upper plate 212 and the lower plate 214 hold the polymer sheets 230 from separating and losing contact from one another. The haptic housing 210 is on the order of five to ten millimeters in dimensions (e.g., height, width, and length). In other embodiments, the haptic housing 210 can vary in shape, material, and dimension. Other embodiments can also vary the configuration of the pressure actuator 220 and the polymer sheets 230.

The upper plate 212 and the lower plate 214 are constructed from braking materials which are highly frictional surfaces, in accordance with an embodiment. Upon an applied pressure, the upper plate 212 and the lower plate 214 clamp down on the portion of the polymer sheets that is coupled between the upper plate 212 and the lower plate 214. In another embodiment, the upper plate 212 and the lower plate 214 are low-friction surfaces, such that the upper plate 212 and the lower plate 214 do not restrict mobility of the polymer sheets 230 relative to the haptic housing 210 but can still restrict bending to varying degrees through the translational immobility of each polymer sheet 230 in relation to the other polymer sheets 230. In another embodiment the lower plate 214 is a magnetic plate and the upper plate 212 is a nonmagnetic plate. This embodiment can be configured to restrict bending to varying degrees with the pressure actuator 220 as an electromagnet applying a magnetic force on the lower plate 214 to clamp the polymer sheets 230. In other embodiments, the upper plate 212 and the lower plate 214 of the haptic housing 210 can be constructed by a variety of materials including silicone, thermoset/thermoplastic polymers, metal, braking materials, piezoelectric materials, or some combination thereof.

The pressure actuator 220 is a flexible and expandable bladder, in accordance with this embodiment. The pressure actuator 220 resides within the haptic housing 210 and is coupled to the upper plate 212 in the haptic housing 210. The pressure actuator 220 is also coupled to the polymer sheets 230. The pressure actuator 220 applies a pressure on the polymer sheets 230. The pressure actuator 220 can adjust the pressure applied on the polymer sheets 230. While FIG. 2A shows the pressure actuator 220 as a flexible and expandable bladder, in other embodiments the pressure actuator 220 can produce a pressure to the polymer sheets 230 in various ways such as electrical stimulation of a piezoelectric material to induce pressure from the mechanical stress or electrical stimulation of an electromagnet actuated to pull a metallic plate to squeeze the polymer sheets. While FIG. 2A does not show the pressure actuator 220 to be coupled with anything but the polymer sheets 230, in other embodiments the pressure actuator 220 can be modulated by the haptic controller 170 through the signaling pathway 150 to provide the haptic feedback to the user.

The polymer sheets 230 is comprised of a plurality of polymer sheets. The set of polymer sheets 230 are stacked together, and a portion of the of polymer sheets 230 are within the haptic housing 210 coupled between the upper plate 212 and the lower plate 214, and the remaining portions of the polymer sheets extend along the glove digit of the glove body 110 in opposite directions away from the haptic housing 210, in accordance with this embodiment. A first polymer sheet 232 is in contact with the pressure actuator 220 and a fourth polymer sheet 234 is in contact with the lower plate 214 of the haptic housing 210. While FIG. 2A shows there to be four polymer sheets in the set of polymer sheets 230, in other embodiments the set of polymer sheets 230 can include any plurality of sheets. Likewise in other embodiments, the polymer sheets 230 are flexible and inextensible sheets that can be constructed of other materials such as silicone, ceramics, thermosets/thermoplastics, or any combination thereof.

The translational movement 240 of the polymer sheets 230 dictates a degree of bending ability at a bend location coupled to the haptic apparatus 160. FIG. 2A shows an example system of the pressure actuator 220 applying a compressive force below a threshold pressure. Below the threshold pressure, the polymer sheets 230 are unrestricted due to an insignificant contact force between any two of the polymer sheets 230. With the insignificant contact force between any two of the polymer sheets 230, there exists an insignificant friction between any two of the polymer sheets 230. As the polymer sheets 230 have no resistance in the translational movement 240, the sheets can also undergo free bending.

Figure 2B:
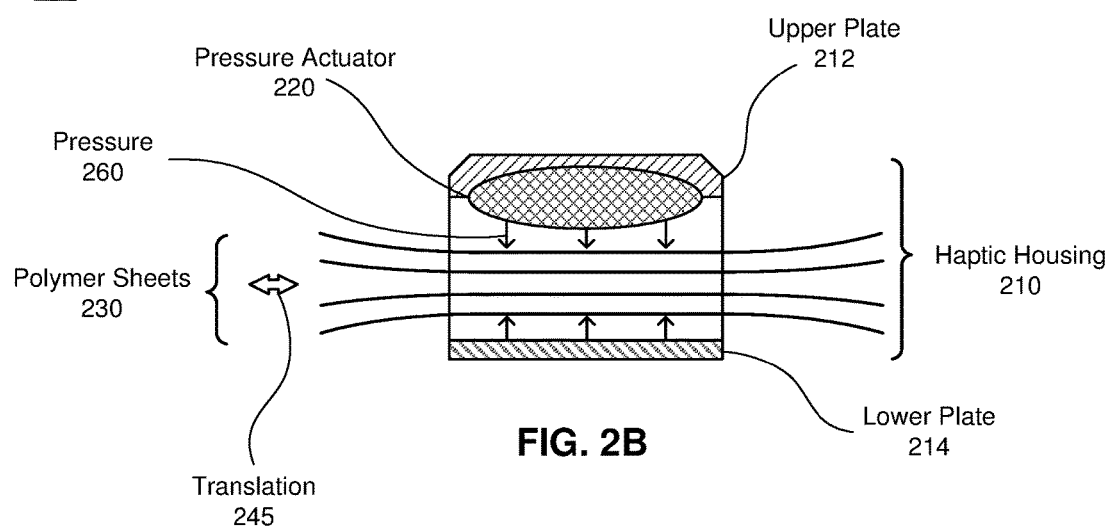
FIG. 2B is a cross sectional view of a haptic apparatus with a pressure actuator restricting bending, in accordance with an embodiment.

FIG. 2B is a cross sectional view of the haptic apparatus 160 with the pressure actuator 220 applying a pressure 260 above the threshold pressure thus restricting bending, in accordance with an embodiment. The haptic apparatus 160 in this example embodiment shows the pressure actuator 220 applying the pressure 260 on the portion of the polymer sheets 230 between the upper plate 212 and the lower plate 214 of the haptic housing 210 which provides a degree of translational immobility of each of the polymer sheets 230 relative to any adjacent polymer sheets 230 denoted by a translation 245. In other embodiments, the haptic apparatus 160 comprises additional or fewer elements than those described herein.

The pressure actuator 220 is applying a compressive pressure 260 above the threshold pressure to compress the polymer sheets 230. The pressure actuator 220 is in a relative expansion of the expandable bladder compared to the pressure actuator 220 in FIG. 2A. The pressure actuator 220 and the lower plate 214 exert the compressive pressure 260 on the polymer sheets 230. In FIG. 2B the pressure actuator 220 and the lower plate 214 clamp down on the polymer sheets. As described earlier, the compressive pressure 260 is above the threshold pressure inducing a translational immobility denoted by a translation 245. The translational immobility corresponds to a degree of friction between the polymer sheets 230. The degree of friction causing the translation immobility 245 is proportional to the compressive pressure 260 applied by the pressure actuator 220. The degree of translational immobility of the polymer sheets 230 supplies a degree of bending resistance at the bend location. The degree of bending resistance at the bend location is associated with a spectrum of rigidity of the haptic feedback. There exists also an upper limit to the compressive pressure 260 that can be applied by the pressure actuator 220. At or above the upper limit, there is no translational mobility thus a maximal bending resistance. In another embodiment, an intermediate plate is coupled between the pressure actuator 220 and the polymer sheets 230, wherein the pressure actuator 220 exerts a force on the intermediate plate; thus the intermediate plate and the lower plate 214 exert a compressive pressure 260 on the polymer sheets 230. In other embodiments the pressure actuator 220 can produce a pressure on the polymer sheets 230 in various ways such as electrical stimulation of a piezoelectric material to induce pressure from the mechanical stress or electrical stimulation of an electromagnet actuated to pull a metallic plate to squeeze the polymer sheets 230.

System Overview

Figure 3:
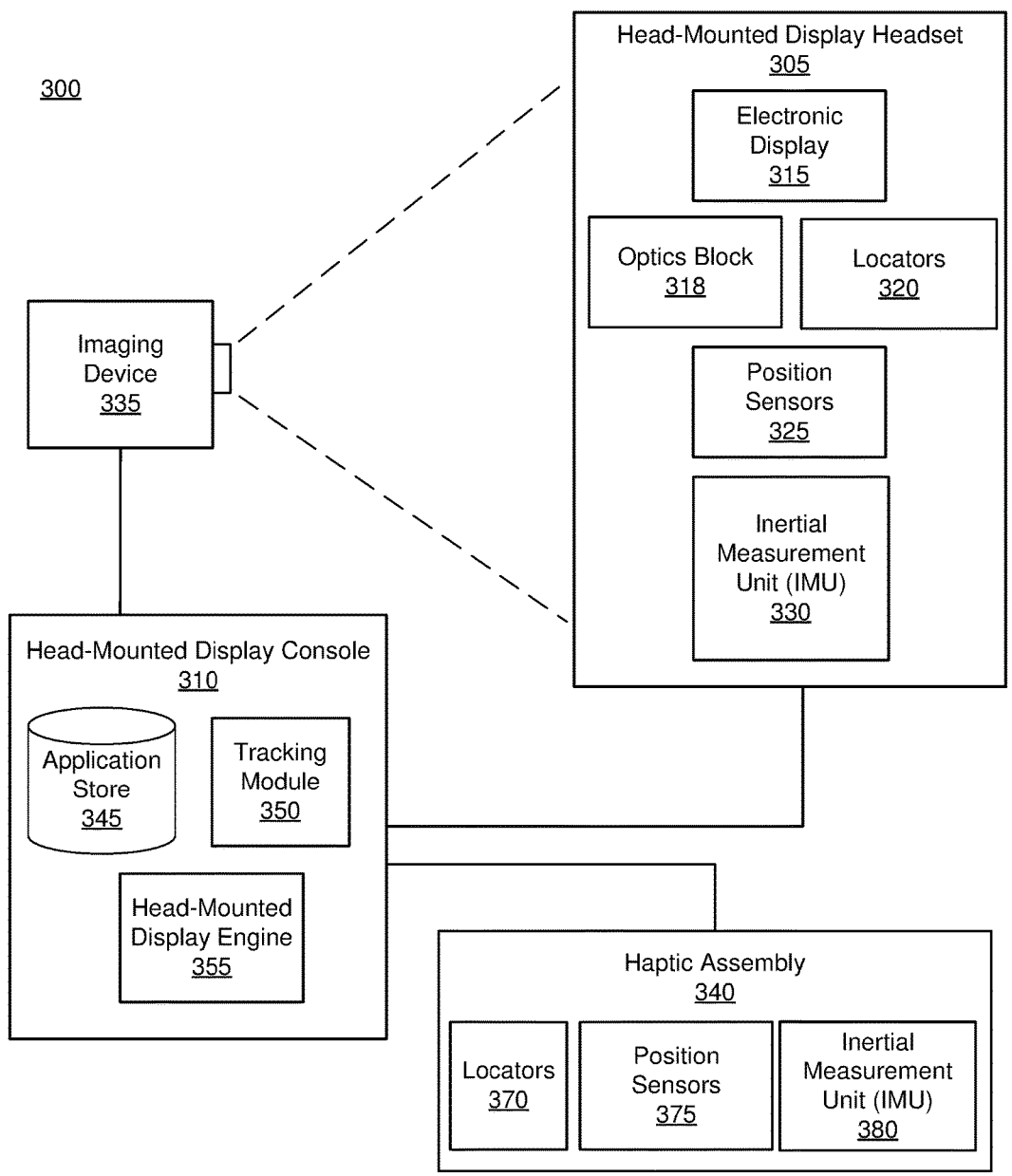
FIG. 3 is a block diagram of a system environment including a HMD system, in accordance with an embodiment.

FIG. 3 is a block diagram of a HMD system 300 in which a HMD console 310 operates. The HMD system 300 may be for use as an artificial reality system. The HMD system 300 shown by FIG. 3 comprises a HMD headset 305, a HMD console 310, an imaging device 335, and a haptic assembly 340. While FIG. 3 shows an example system 300 including one HMD headset 305, one imaging device 335, and one haptic assembly 340 (e.g., a haptic glove 100), in other embodiments any number of these components may be included in the HMD system 300. For example, there may be multiple HMD headsets 305 each having an associated haptic assembly 340 and being monitored by one or more imaging devices 335, with each HMD headset 305, haptic assembly 340, and imaging devices 335 communicating with the HMD console 310. In alternative configurations, different and/or additional components may be included in the system environment 300. Similarly, the functions can be distributed among the components in a different manner than is described here. For example, some or all of the functionality of the HMD console 310 may be contained within the HMD headset 305.

The HMD headset 305 may act as an artificial reality display. An MR and/or AR HMD augments views of a physical, real-world environment with computer-generated elements (e.g., images, video, sound, etc.). The HMD headset 305 presents content to a user. Example content includes images, video, audio, or some combination thereof. Audio content may be presented via a separate device (e.g., speakers and/or headphones) external to the HMD headset 305 that receives audio information from the HMD headset 305, the console 310, or both. The HMD headset 305 includes an electronic display 315, an optics block 318, one or more locators 320, one or more position sensors 325, and an IMU 330. The electronic display 315 displays images to the user in accordance with data received from the HMD console 310.

The optics block 318 magnifies received light from the electronic display 315, corrects optical errors associated with the image light, and the corrected image light is presented to a user of the HMD headset 305. An optical element may be an aperture, a Fresnel lens, a convex lens, a concave lens, a filter, or any other suitable optical element that affects the image light emitted from the electronic display 315. Moreover, the optics block 318 may include combinations of different optical elements. In some embodiments, one or more of the optical elements in the optics block 318 may have one or more coatings, such as anti-reflective coatings.

The locators 320 are objects located in specific positions on the HMD headset 305 relative to one another and relative to a specific reference point of the HMD headset 305. A locator 320 may be a light emitting diode (LED), a corner cube reflector, a reflective marker, a type of light source that contrasts with an environment in which the HMD headset 305 operates, or some combination thereof. In embodiments where the locators 320 are active (i.e., an LED or other type of light emitting device), the locators 320 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 320 are located beneath an outer surface of the HMD headset, which is transparent to the wavelengths of light emitted or reflected by the locators 320 or is thin enough not to substantially attenuate the wavelengths of light emitted or reflected by the locators 320. Additionally, in some embodiments, the outer surface or other portions of the HMD headset 305 are opaque in the visible band of wavelengths of light. Thus, the locators 320 may emit light in the IR band under an outer surface that is transparent in the IR band but opaque in the visible band.

The IMU 330 is an electronic device that generates IMU data of the HMD headset 305 based on measurement signals received from one or more of the position sensors 325. A position sensor 325 generates one or more measurement signals in response to motion of the HMD headset 305. Examples of position sensors 325 include: one or more accelerometers, one or more gyroscopes, one or more magnetometers, another suitable type of sensor that detects motion, a type of sensor used for error correction of the IMU 330, or some combination thereof. The position sensors 325 may be located external to the IMU 330, internal to the IMU 330, or some combination thereof.

Based on the one or more measurement signals from one or more position sensors 325, the IMU 330 generates IMU data of the HMD headset 305 indicating an estimated position of the HMD headset 305 relative to an initial position of the HMD headset 305. For example, the position sensors 325 include multiple accelerometers to measure translational motion (forward/back, up/down, left/right) and multiple gyroscopes to measure rotational motion (e.g., pitch, yaw, and roll) of the HMD headset 305. In some embodiments, the IMU 330 rapidly samples the measurement signals and calculates the estimated position of the HMD headset 305 from the sampled data. For example, the IMU 330 integrates the measurement signals received from the accelerometers over time to estimate a velocity vector and integrates the velocity vector over time to determine an estimated position of a reference point of the HMD headset 305. Alternatively, the IMU 330 provides the sampled measurement signals to the HMD console 310, which determines the IMU data of the HMD headset 305. The reference point of the HMD headset 305 is a point that may be used to describe the position of the HMD headset 305. While the reference point of the HMD headset 305 may generally be defined as a point in space; however, in practice the reference point of the HMD headset 305 is defined as a point within the HMD headset 305 (e.g., a center of the IMU 330).

The IMU 330 receives one or more calibration parameters of the HMD headset 305 from the HMD console 310. As further discussed below, the one or more calibration parameters of the HMD headset 305 are used to maintain tracking of the HMD headset 305. Based on a received calibration parameter of the HMD headset 305, the IMU 330 may adjust one or more IMU parameters (e.g., sample rate). In some embodiments, certain calibration parameters of the HMD headset 305 cause the IMU 330 to update an initial position of the reference point of the HMD headset 305 so it corresponds to a next calibrated position of the reference point of the HMD headset 305. Updating the initial position of the reference point of the HMD headset 305 as the next calibrated position of the reference point of the HMD headset 305 helps reduce accumulated error associated with the determined estimated position. The accumulated error, also referred to as drift error, causes the estimated position of the reference point of the HMD headset 305 to "drift" away from the actual position of the reference point of the HMD headset 305 over time.

The haptic assembly 340 is an apparatus for providing haptic feedback to the user. The haptic assembly 340 includes locators 370, one or more position sensors 375, and an inertial measurement unit (IMU) 380, in accordance with an embodiment. In some embodiments, the locators 370, one or more position sensors 375, an IMU 380 are employed to determine a position or movement of the haptic assembly 340. In other embodiments, the haptic assembly 340 contains additional or fewer components. For example, the haptic assembly 340 does not contain an IMU 380, but the locators 370 and the position sensors 375 provide positional data regarding the haptic assembly 340. In addition, the haptic assembly 340 receives, from the HMD console 310, a haptic feedback signal corresponding to haptic feedback emulating a user contacting a virtual object with certain rigidity. The haptic assembly 340 provides tactile perception including a rigidity of a virtual object to a user in accordance with the haptic feedback signal received from the HMD console 310. In an embodiment, the haptic assembly 340 is a haptic glove 100 that receives the feedback signal and provides the tactile perception to the user.

In another embodiment, the haptic feedback signal indicates a position or a portion of the haptic assembly 340 to be actuated, and an amount of actuation of the position or the portion of the haptic assembly 340 for providing haptic feedback. In this embodiment, the amount of actuation is determined by, e.g., the HMD console 310, according to a rigidity of a virtual object in contact with the haptic assembly 340. The haptic assembly 340 provides tactile perception including a rigidity of a virtual object to a user at the position or portion of the haptic assembly 340 according to the amount of actuation indicated by the haptic feedback signal. In accordance to the embodiment shown in FIGS. 1 & 2, the haptic feedback signal is received by the haptic glove 100.

The locators 370 are objects located in specific positions on the haptic assembly 340 relative to one another and relative to a specific reference point of the haptic assembly 340 on the haptic assembly 340. A locator 370 is substantially similar to a locator 320 except that a locator 370 is part of the haptic assembly 340. Additionally, in some embodiments, the outer surface or other portions of the haptic assembly 340 are opaque in the visible band of wavelengths of light. Thus, the locators 370 may emit light in the IR band under an outer surface that is transparent in the IR band but opaque in the visible band. The configuration and operation of the locators 370 are similar to the locators of 120 of the haptic glove 100 of FIG. 1.

A position sensor 375 generates one or more measurement signals in response to motion of the haptic assembly 340. The position sensors 375 are substantially similar to the positions sensors 325, except that the position sensors 375 are part of the haptic assembly 340. The position sensors 375 may be located external to the IMU 380, internal to the IMU 380, or some combination thereof. The configuration and operation of the position sensor 375 is similar to the position sensor 130 of the haptic glove 100 of FIG. 1.

Based on the one or more measurement signals from one or more position sensors 375, the IMU 380 generates IMU data of the haptic assembly 340 indicating an estimated position of the haptic assembly 340 relative to an initial position of the haptic assembly 340. For example, the position sensors 375 include multiple accelerometers to measure translational motion (forward/back, up/down, left/right) and multiple gyroscopes to measure rotational motion (e.g., pitch, yaw, and roll) of the haptic assembly 340. In some embodiments, the IMU 380 rapidly samples the measurement signals and calculates the estimated position of the haptic assembly 340 from the sampled data. For example, the IMU 380 integrates the measurement signals received from the accelerometers over time to estimate a velocity vector and integrates the velocity vector over time to determine an estimated position of a reference point of the haptic assembly 340. Alternatively, the IMU 380 provides the sampled measurement signals to the HMD console 310, which determines the IMU data of the haptic assembly 340. The reference point of the haptic assembly 340 is a point that may be used to describe the position of the haptic assembly 340. While the reference point of the haptic assembly 340 may generally be defined as a point in space; however, in practice the reference point of the haptic assembly 340 is defined as a point within the haptic assembly 340 (e.g., a center of the IMU 380). The configuration and operation of the IMU 380 is similar to the IMU 140 of the haptic glove 100 of FIG. 1.

The IMU 380 receives one or more calibration parameters of the haptic assembly 340 from the HMD console 310. As further discussed below, the one or more calibration parameters of the haptic assembly 340 are used to maintain tracking of the haptic assembly 340. Based on a received calibration parameter of the haptic assembly 340, the IMU 380 may adjust one or more IMU parameters (e.g., sample rate). In some embodiments, certain calibration parameters of the haptic assembly 340 cause the IMU 380 to update an initial position of the reference point of the haptic assembly 340 so it corresponds to a next calibrated position of the reference point of the haptic assembly 340. Updating the initial position of the reference point of the haptic assembly 340 as the next calibrated position of the reference point of the haptic assembly 340 helps reduce accumulated error associated with the determined estimated position. The configuration and operation of the IMU 380 is similar to the IMU 140 of the haptic glove 100 of FIG. 1.

The haptic assembly 340 provides haptic feedback including a rigidity of a virtual object in contact. In one embodiment, the haptic assembly 340 is a haptic glove 100 through which the HMD console 310 can detect a user hand movement and provide tactile perception to the user hand. Moreover, the haptic glove 100 receives a haptic feedback signal indicating the position or the portion to be actuated and the amount of actuation corresponding to the rigidity of the virtual object.

The imaging device 335 generates imaging data in accordance with calibration parameters received from the HMD console 310. Imaging data (herein also referred to as "imaging information") of the HMD headset includes one or more images showing observed positions of the locators 320 associated with the HMD headset 305 that are detectable by the imaging device 335. Similarly, imaging data of the haptic assembly 340 includes one or more images showing observed positions of the locators 370 associated with the haptic assembly 340 that are detectable by the imaging device 335. In one aspect, the imaging data includes one or more images of both the HMD headset 305 and haptic assembly 340. The imaging device 335 may include one or more cameras, one or more video cameras, any other device capable of capturing images including one or more of the locators 320 and 370, or any combination thereof. Additionally, the imaging device 335 may include one or more filters (e.g., used to increase signal to noise ratio). The imaging device 335 is configured to detect light emitted or reflected from locators 320 and 370 in a field of view of the imaging device 335. In embodiments where the locators 320 and 370 include passive elements (e.g., a retroreflector), the imaging device 335 may include a light source that illuminates some or all of the locators 320 and 370, which retro-reflect the light towards the light source in the imaging device 335. Imaging data is communicated from the imaging device 335 to the HMD console 310, and the imaging device 335 receives one or more calibration parameters from the HMD console 310 to adjust one or more imaging parameters (e.g., focal length, focus, frame rate, ISO, sensor temperature, shutter speed, aperture, etc.).

The HMD console 310 provides media to the HMD headset 305 for presentation to the user in accordance with information received from one or more of: the imaging device 335, the HMD headset 305, and the haptic assembly 340. The HMD console 310 may also instruct the haptic assembly 340 to provide haptic feedback including rigidity of a virtual object in contact with a user. In the example shown in FIG. 3, the HMD console 310 includes a rigidity store 345, a tracking module 350, and a HMD engine 355. Some embodiments of the HMD console 310 have different modules than those described in conjunction with FIG. 3. Similarly, the functions further described below may be distributed among components of the HMD console 310 in a different manner than is described here.

The rigidity store 345 stores rigidity levels of different virtual objects as a look up table that can be accessed by the HMD console 310 when executing one or more applications. The rigidity of a virtual object may be described according to a selected rigidity level from a predetermined set of rigidity levels. The predetermined set of rigidity levels may be obtained, for example, based on Rockwell hardness scale. Different rigidity levels may be assigned to different virtual objects according to empirical experiments. For example, virtual rubber may have a low rigidity level assigned (e.g., '10' out of '100'), whereas virtual steel may have a high rigidity level assigned (e.g., '85' out of '100'). In one example, the highest rigidity level (e.g., '100') corresponds to a configuration of the haptic assembly 340 causing a maximum actuation (e.g., minimum contact with the user) possible for the haptic assembly 340. In another example, the lowest rigidity level (e.g., '0') corresponds to a configuration of the haptic assembly 340 causing a minimum actuation (e.g., maximum contact with the user) possible for the haptic assembly 340. Intermediate rigidity levels correspond to configurations of the haptic assembly 340 causing corresponding amount of actuation of the haptic assembly 340 between the maximum actuation and the minimum actuation.

The tracking module 350 calibrates the HMD system 300 using one or more calibration parameters and may adjust one or more calibration parameters to reduce error in determination of the position of the HMD headset 305 and/or the haptic assembly 340.

The tracking module 350 tracks movements of the HMD headset 305 using imaging information of the HMD headset 305 from the imaging device 335. The tracking module 350 determines positions of a reference point of the HMD headset 305 using observed locators from the imaging information and a model of the HMD headset 305. The tracking module 350 also determines positions of a reference point of the HMD headset 305 using position information from the IMU information of the HMD headset 305. Additionally, in some embodiments, the tracking module 350 may use portions of the IMU information, the imaging information, or some combination thereof of the HMD headset 305, to predict a future location of the headset 305. The tracking module 350 provides the estimated or predicted future position of the HMD headset 305 to the HMD engine 355.

In addition, the tracking module 350 tracks movements of the haptic assembly 340 using imaging information of the haptic assembly 340 from the imaging device 335. The tracking module 350 determines positions of a reference point of the haptic assembly 340 using observed locators from the imaging information and a model of the haptic assembly 340. The tracking module 350 also determines positions of a reference point of the haptic assembly 340 using position information from the IMU information of the haptic assembly 340. Additionally, in some embodiments, the tracking module 350 may use portions of the IMU information, the imaging information, or some combination thereof of the haptic assembly 340, to predict a future location of the haptic assembly 340. The tracking module 350 provides the estimated or predicted future position of the haptic assembly 340 to the HMD engine 355.

The HMD engine 355 executes applications within the system environment 300 and receives position information, acceleration information, velocity information, predicted future positions, or some combination thereof of the HMD headset 305 from the tracking module 350. Based on the received information, the HMD engine 355 determines content to provide to the HMD headset 305 for presentation to the user. For example, if the received information indicates that the user has looked to the left, the HMD engine 355 generates content for the HMD headset 305 that mirrors the user's movement in a virtual environment. Additionally, the HMD engine 355 performs an action within an application executing on the HMD console 310 in response to detecting a motion of the haptic assembly 340 and provides feedback to the user that the action was performed. In one example, the HMD engine 355 instructs the HMD headset 305 to provide visual or audible feedback to the user. In another example, the HMD engine 355 instructs the haptic assembly 340 to provide haptic feedback including a rigidity of a virtual object to the user.

In addition, the HMD engine 355 receives position information, acceleration information, velocity information, predicted future positions, or some combination thereof of the haptic assembly 340 from the tracking module 350 and determines whether a virtual touch event occurred. A virtual touch event herein refers to an event of a user contacting a virtual object in a virtual space. For example, an image of a virtual object is presented to the user on the HMD headset 305. Meanwhile, the HMD engine 355 collectively analyzes positions of multiple sensors of the haptic assembly 340 through the tracking module 350, and generates a three dimensional mapping of the haptic assembly 340 describing the position and the shape of the haptic assembly 340. The three dimensional mapping of the haptic assembly 340 describes coordinates of various parts of the haptic assembly 340 in a virtual space corresponding to physical positions of the parts of the haptic assembly 340 in reality. Responsive to the user performing an action to grab the virtual object or the user being contacted by the virtual object, the HMD engine 355 determines that the virtual touch event occurred.

In one embodiment, the HMD engine 355 compares coordinates of a virtual object and a coordinate of the haptic assembly 340 in a virtual space to determine whether a virtual touch event occurred. The HMD engine 355 obtains a coordinate of the virtual object in a virtual space, in accordance with an image presented via the HMD headset 305. Additionally, the HMD engine 355 obtains a coordinate of the haptic assembly 340 (e.g., haptic glove) corresponding to a physical position of the HMD haptic assembly 340 from the tracking module 350 or the three dimensional mapping of the haptic assembly 340. Then, the HMD engine 355 compares the coordinate of the virtual object in the virtual space and the coordinate of the haptic assembly 340 in the virtual space. For example, if two coordinates of the virtual object and the haptic assembly 340 overlap or are approximate to each other within a predetermined distance for a predetermined amount of time (e.g., 1 second), the HMD console 310 determines the virtual touch event occurred.

In one embodiment, the HMD engine 355 generates a haptic feedback signal in responsive to the virtual touch event detected. Responsive to detecting the virtual touch event, the HMD engine 355 determines a rigidity of the virtual object in contact with the user. In one aspect, the haptic feedback signal indicates which portion (e.g., a coordinate or a position) of the haptic assembly 340 to provide haptic feedback and the rigidity of the virtual object. The HMD engine 355 obtains the predetermined rigidity corresponding to the virtual object from the rigidity store 345. For example, the HMD engine 355 determines which virtual object is in contact with the user (e.g., a ball, a pillow, a piece of wood, etc.) and obtains the rigidity corresponding to the determined virtual object from the rigidity store 345. Moreover, the HMD engine 355 determines which part of the virtual object is in contact (e.g., an index finger), and generates the haptic feedback signal accordingly. In another aspect, the HMD engine 355 determines an amount of actuation corresponding to the rigidity level, and generates the haptic feedback signal indicating the determined amount of actuation instead of the rigidity level. The HMD engine 355 provides the haptic feedback signal to the haptic assembly 340 for executing the haptic feedback. In accordance with an embodiment, the haptic controller 170 of FIG. 1 receives the haptic feedback signal indicating the coordinate of the haptic glove 100 to provide haptic feedback and the amount of rigidity or bending resistance the haptic apparatus 160 should apply. The haptic controller 170 sends a haptic actuation signal to the haptic apparatus 160 corresponding to the indicated position/portion to be actuated and the degree of bending resistance. The haptic apparatus 160 provides the haptic feedback by adjusting the degree of bending resistance.

Figure 4:
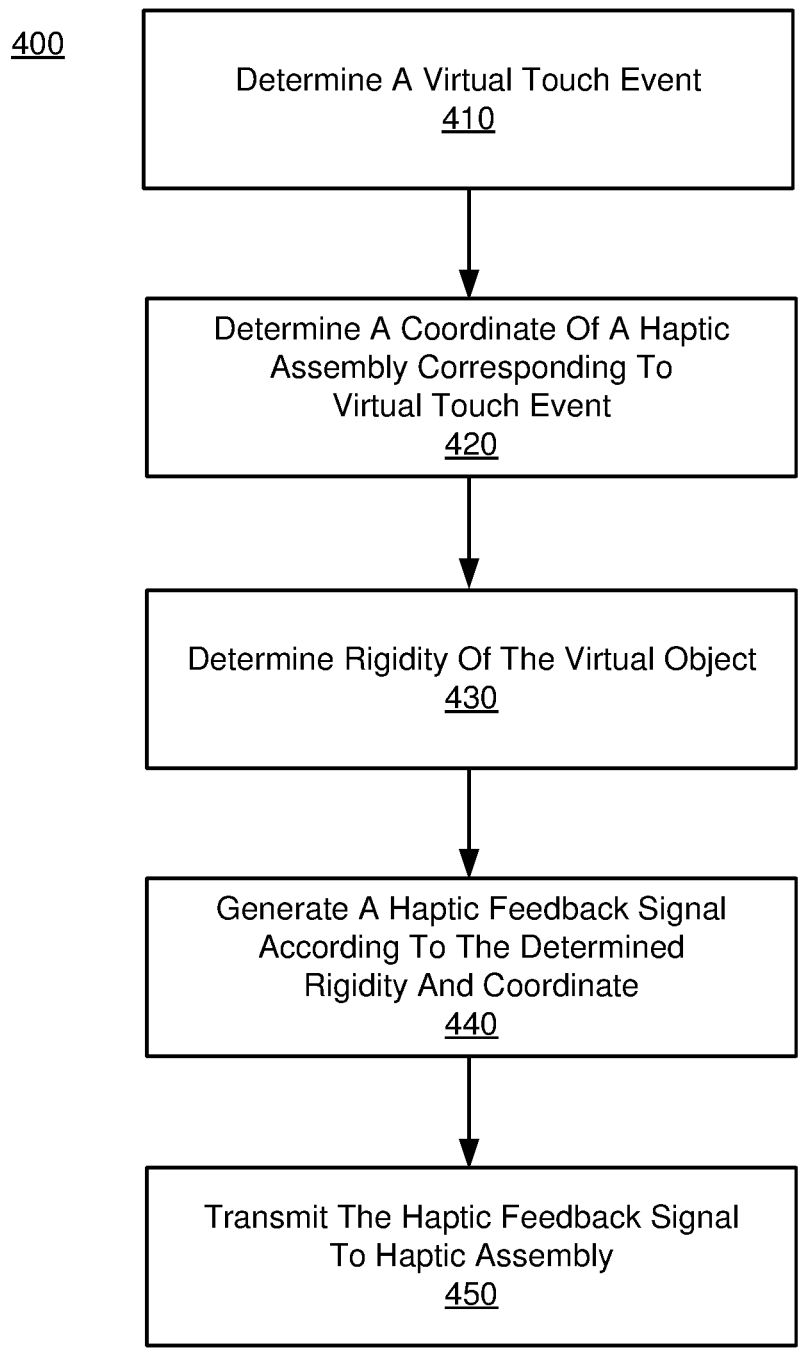
FIG. 4 is a flow chart illustrating a process of providing haptic feedback responsive to a virtual touch event in a virtual space, in accordance with an embodiment.

FIG. 4 is a flow chart illustrating a process 400 of providing haptic feedback responsive to a virtual touch event in a virtual space, in accordance with an embodiment. In one embodiment, the process of FIG. 4 is performed by a console (e.g., HMD console 310 of FIG. 3). Other entities may perform some or all of the steps of the process in other embodiments. Likewise, embodiments may include different and/or additional steps, or perform the steps in different orders.

The console determines 410 a virtual touch event. In one embodiment, the console receives IMU data from the haptic assembly (e.g., the haptic assembly 340 of FIG. 3 or the haptic glove 100 of FIG. 1) and/or imaging data from the imaging device (e.g., imaging device 335 of FIG. 3), and then determines a haptic feedback to the haptic assembly. In one approach, the console obtains 3-D map of the user hand describing coordinates of various parts of the haptic glove in a virtual space corresponding to physical positions of the parts of the haptic glove in reality based on the IMU data and/or the imaging data. The console compares the coordinate of the virtual object in the virtual space and the coordinate of the haptic glove in the virtual space to determine whether a virtual touch event occurred. Responsive to determining the virtual touch event occurred, the console determines 420 a coordinate of the haptic assembly corresponding to the virtual touch event. For example, responsive to the user pressing a plush ball in a virtual space with an index finger, the console determines such virtual touch event occurred, and identifies a portion of the haptic assembly corresponding to the index finger.

The console determines 430 a rigidity of the virtual object. The rigidity of a virtual object can be obtained from a list of virtual objects and corresponding rigidities that are predetermined (e.g., via a look-up table). Continuing on the above example, the console determines a rigidity of the plush ball (e.g., '10' out of '100', where '100' indicates the highest rigidity).

The console generates 440 a haptic feedback signal describing details of the haptic feedback to be provided, according to the determined rigidity and coordinate. In one embodiment, the haptic feedback signal indicates which haptic apparatus should be actuated corresponding to the coordinate of the haptic assembly and a rigidity level.

The console transmits 450 the haptic feedback signal 440 to the haptic assembly (e.g., the haptic assembly of 340). In accordance with an embodiment, the haptic assembly is a haptic glove 100 of FIG. 1 with a haptic controller 170 which is the destination of the haptic feedback signal 440.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A haptic glove, comprising:
   a glove body including a glove digit corresponding to a phalange of a user hand, the glove digit having a bend location that is located along a centerline that bisects a surface of the glove digit;
   a haptic apparatus coupled to the glove body at the glove digit, the haptic apparatus comprising:
      a plurality of sheets that are flexible and inextensible, the plurality of sheets are stacked and configured to translate relative to each other along the centerline with bending of the glove digit, and a resistance to bending the glove digit is based in part on friction between at least some of the plurality of sheets, and
      a pressure actuator coupled to one or more sheets of the plurality of sheets, the pressure actuator configured to adjust a pressure applied to one or more sheets of the plurality of sheets to adjust friction between some of the plurality of sheets, the friction adjusting the resistance to bending the glove digit at the bend location.

2. The haptic glove of claim 1, wherein a sheet of the plurality of sheets is composed of a polymer.

3. The haptic glove of claim 1, wherein the plurality of sheets includes a first sheet, and the haptic glove further comprises:
   an inflexible plate with a braking surface, the braking surface adjacent to a surface of the first sheet.

4. The haptic glove of claim 1, wherein the pressure actuator comprises an expandable bladder that controls the pressure applied to an intermediate plate coupled between the expandable bladder and the plurality of sheets, wherein the intermediate plate applies a variable pressure to the one or more sheets of the plurality of sheets based in part on the pressure applied by the expandable bladder, the expandable bladder has a plurality of sizes and each size of the plurality of sizes corresponds to a different pressure applied to the one or more sheets of the plurality of sheets.

5. The haptic glove of claim 1, wherein the pressure actuator comprises a controllable electromagnet and a metallic plate that is positioned between the electromagnet and the one or more sheets, and the electromagnet controls the pressure applied to the one or more sheets by applying a magnetic force to the metallic plate.

6. The haptic glove of claim 1, wherein the pressure actuator is coupled to an individual sheet of the plurality of sheets.

7. The haptic glove of claim 1, wherein the pressure actuator is coupled to at least two sheets of the plurality of sheets.

8. The haptic glove of claim 1, wherein the bending resistance at the bend location on the glove digit is determined by a rigidity of a virtual object.

9. The haptic glove of claim 1, wherein the glove digit has a palmar surface and a dorsal surface that is opposite the palmar surface, and the haptic apparatus coupled to the glove body is located on the dorsal surface of the glove digit, the haptic glove further comprising:
   a second haptic apparatus coupled to the glove body at the bend location on the palmar surface of the glove digit.

10. The haptic glove of claim 1, wherein the plurality of sheets are coupled to the glove digit, and at least some of the plurality of sheets are coupled to different locations on the glove digit.

11. A haptic article of clothing, comprising:
   a fabric body including a bend location that is located along a centerline that bisects a surface of the fabric body;
   a haptic apparatus coupled to the fabric body at a position along the centerline and adjacent to the bend location, the haptic apparatus comprising:
      a plurality of sheets that are flexible and inextensible, the plurality of sheets are stacked and configured to translate relative to each other along the centerline with bending of the glove digit, and a resistance to bending the glove digit is based in part on friction between at least some of the plurality of sheets, and
      a pressure actuator coupled to one or more sheets of the plurality of sheets, the pressure actuator configured to adjust a pressure applied to one or more sheets of the plurality of sheets to adjust friction between some of the plurality of sheets, the friction adjusting the resistance to bending the fabric body along the bisection.

12. The haptic article of clothing of claim 11, wherein a sheet of the plurality of sheets is composed of a polymer.

13. The haptic article of clothing of claim 11, wherein the plurality of sheets includes a first sheet, and the haptic article of clothing further comprises:
   an inflexible plate with a braking surface, the braking surface adjacent to a surface of the first sheet.

14. The haptic article of clothing of claim 11, wherein the pressure actuator comprises an expandable bladder that controls the pressure applied to an intermediate plate coupled between the expandable bladder and the plurality of sheets, wherein the intermediate plate applies a variable pressure to the one or more sheets of the plurality of sheets based in part on the pressure applied by the expandable bladder, the expandable bladder has a plurality of sizes and each size of the plurality of sizes corresponds to a different pressure applied to the one or more sheets of the plurality of sheets.

15. The haptic article of clothing of claim 11, wherein the pressure actuator comprises a controllable electromagnet and a metallic plate that is positioned between the electromagnet and the one or more sheets, and the electromagnet controls the pressure applied to the one or more sheets by applying a magnetic force to the metallic plate.

16. The haptic article of clothing of claim 11, wherein the pressure actuator is coupled to an individual sheet of the plurality of sheets.

17. The haptic article of clothing of claim 11, wherein the pressure actuator is coupled to at least two sheets of the plurality of sheets.

18. The haptic article of clothing of claim 11, wherein the bending resistance at the bend location on the article of clothing is determined by a rigidity of a virtual object.

19. The haptic article of clothing of claim 11, wherein the haptic joint has an anterior surface and a posterior surface that is opposite the anterior surface, and the haptic apparatus coupled to the fabric body is located on the posterior surface of the haptic joint, the haptic article of clothing further comprising:
    a second haptic apparatus coupled to the fabric body at the bend location on the anterior surface of the haptic joint.

20. The haptic article of clothing of claim 11, wherein the plurality of sheets are coupled to the fabric body, and at least some of the plurality of sheets are coupled to different locations on the fabric body.

\* \* \* \* \*